United States Patent [19]
Tessier et al.

[11] Patent Number: 6,039,068
[45] Date of Patent: Mar. 21, 2000

[54] APPARATUS FOR SHIELDING AN ARTICULATED STRUCTURE

[75] Inventors: Clément Tessier, Terrebonne; François Beaumont, Laval; Pierre Turcotte, Beaconsfield, all of Canada

[73] Assignee: Centre de Recherche Indust. du Quebec, Quebec, Canada

[21] Appl. No.: 09/120,823

[22] Filed: Jul. 22, 1998

[30] Foreign Application Priority Data

Aug. 18, 1997 [CA] Canada ................................. 2213287

[51] Int. Cl.⁷ ............................... B25J 3/00; F16L 35/00
[52] U.S. Cl. ......................... 137/377; 137/580; 901/27; 901/49
[58] Field of Search .................................. 137/377, 580; 901/49, 27–29; 285/133.1

[56] References Cited

U.S. PATENT DOCUMENTS

| | | | |
|---|---|---|---|
| 3,620,253 | 11/1971 | Walker et al. | 137/580 |
| 4,668,146 | 5/1987 | Ageta | 901/49 |
| 4,984,745 | 1/1991 | Akeel et al. | 901/49 |
| 5,054,523 | 10/1991 | Rink | 137/377 |
| 5,065,062 | 11/1991 | Uehara et al. | 901/49 |
| 5,212,432 | 5/1993 | Ohtani et al. | 901/49 |
| 5,772,520 | 6/1998 | Nicholas et al. | 137/580 |

*Primary Examiner*—A. Michael Chambers
*Attorney, Agent, or Firm*—Carter & Schnedler

[57] ABSTRACT

According to a first embodiment, an apparatus for shielding a movable articulated structure such as robot arm to be protected from a hard working environment comprises one or more shielding sections forming with the outer surface of the robot arm a cavity which is filled with pressurized air. Adjacent portions of the shielding sections are coupled through a rotary joint allowing escape of the pressurized air out of the cavity while maintaining within the cavity a positive pressure relative to the ambient environment pressure which is sufficient to substantially prevent contamination of the robot arm from the working environment. According to a second embodiment, the apparatus comprises a shielding cover comprised of one or more cover sections forming with the outer surface of the robot arm a cavity which is filled with pressurized air. A positive gas pressure relative to environment ambient pressure is maintained which is sufficient to substantially prevent contamination of the robot arm from the working environment. The cover section is essentially made of a substantially gastight and impermeable flexible material which is sufficiently stiff to provide the cover section with sufficiently smooth and stiff outer surface under the positive pressure, to substantially prevent physical contact between the robot arm outer surface and the cover section which could otherwise result in cover damage.

12 Claims, 9 Drawing Sheets

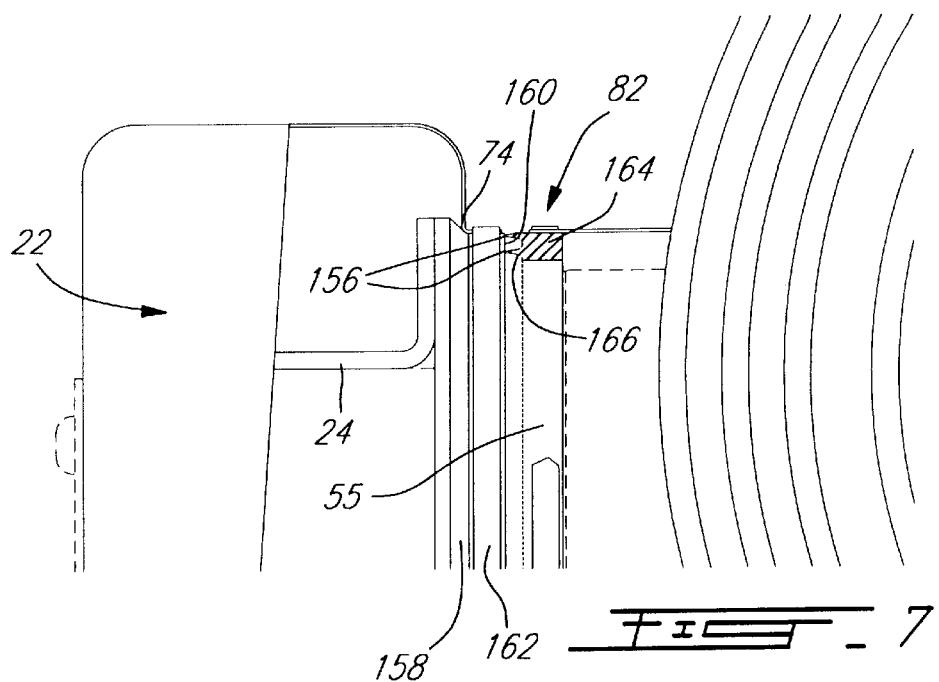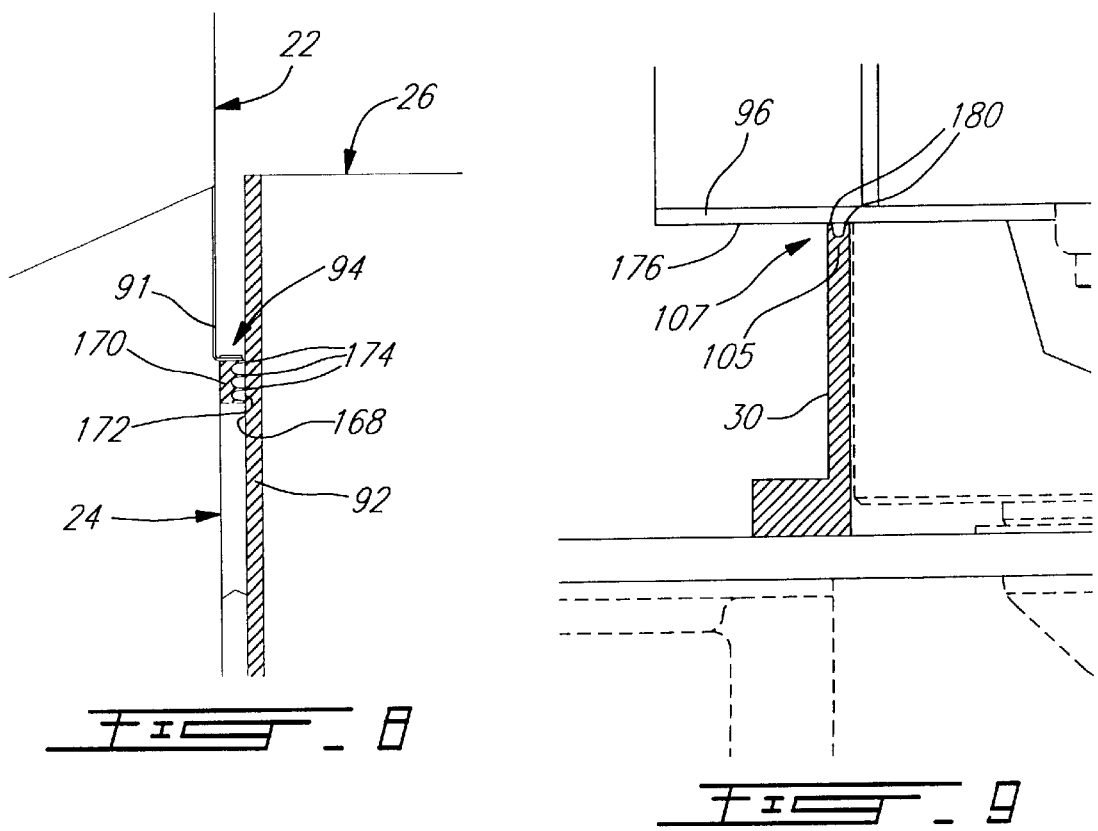

FIG_11

APPARATUS FOR SHIELDING AN ARTICULATED STRUCTURE

FIELD OF THE INVENTION

The present invention relates to protective coverings for use in industrial operations to be carried out in hard working environment, and more particularly to protective apparatus for covering an articulated structure such as a robot arm.

In the past years, use of automated means such as robots has been growing in many industrial activities, to enhance productivity while reducing hazard for workers who had previously to perform labor intensive or hazardous manual operations in hard industrial environments. Increasing diversity and complexity of tasks to be automated have required the development of various sophisticated automated systems using articulated structures such as multi-axis robots. Many of these systems are designed for working in hard and/or explosive working environments, such as in the nuclear, chemical, automotive, mining and meat processing industries, according to industrial standards, to ensure required safety or hygiene while providing adequate shielding of the robot systems against contamination from the working environment. In the past years, meat slaughtering, which has traditionally involved high labor intensive tasks, has shown to be a field particularly proper for use of robot systems in processing lines. For such applications, robots shall comply with meat processing industry standards, especially on those standards regarding sanitary conditions that must prevail in production sites, while ensuring adequate shielding of the articulated structures of the robot systems against contamination from the slaughterhouse working environment.

Heretofore, for the purposes of shielding moving articulated structure, shielding devices and shielded automated systems designed for working in hard environments has been proposed. In U.S. Pat. No. 4,904,514 issued on Feb. 17, 1990 to Morrison et al, there is disclosed a protective covering for mechanical linkage such as a robot arm, which covering is made of a flexible material substantially impermeable to both liquid and particle contaminants, which conforms to the outer surface of the mechanical linkage surface. Although such a covering can be made of initially flat washable smooth material, since it conforms to the generally irregular surface of the covered mechanical linkage, unavoidable wrinkling that occurs at the surface thereof generally prevents thorough washing of the covering which has to be carried out regularly. Any thorough washing operation generally makes necessary to remove the covering from the linkage requiring working interruption, yielding a decrease of productivity due to maintenance. To completely cover a multi-segment mechanical linkage, Morrison teaches a plurality of separate sections secured in place about the linkage through fasteners, forming non-airtight joints therebetween trough which active gas or atomized liquid such as washing liquid could penetrate under the covering and cause harmful contamination of the linkage. Moreover, such prior art covering being in contact with movable parts of the robot arm, covering perforation could result from friction.

To provide automated systems with enhanced isolation from the working environment, shielding devices using airtight cavities or chambers defined between the covering or casing and the structure to be protected have been proposed, which cavities or chambers are being fed with positive inactive gas pressure relative to the ambient pressure of the working environment, to prevent contamination therefrom. Such devices are being disclosed in U.S. Pat. No. 4,668,146 issued on May 26, 1987 to Ageta, U.S. Pat. No. 4,732,536 issued on Mar. 22, 1998 to Nakashima, U.S. Pat. No. 4,984,745 issued on Jan. 15, 1991 to Akeel et al, U.S. Pat. No. 5,212,432 issued on May 18, 1993 to Ohtani et al, and U.S. Pat. No. 5,440,916 issued on Aug. 15, 1995 to Stone et al. To maintain the cavities or chambers airtight, conventional airtight seals are used at articulations between the segments of the moving structure. Especially for heavy duty applications requiring strong articulated structures such as heavy duty robots, such airtight seals could show premature wear due to high friction force exerted thereon due to repetitive movement of the heavy segments at corresponding articulations of the structure, yielding to working interruption for maintenance. Moreover, driving motors or actuators used for moving the structure segments have to continuously compensate for such friction force, which could produce overheating and cause a decrease in movement accuracy.

SUMMARY OF THE INVENTION

It is a feature of an aspect of the present invention to provide a low maintenance apparatus for shielding at least a portion of a movable articulated structure, which portion having to be protected against contamination from a working environment.

It is a feature of another aspect of the present invention to provide a low maintenance shielded apparatus for working in hard environment including a movable articulated structure a portion of which being shielded for protection against contamination from the working environment.

According to the above features, from a broad aspect, there is provided an apparatus for shielding at least a portion of a movable articulated structure including at least two segments connected through an articulation to allow movement of at least one of the segments, the structure portion having to be protected against contamination from a working environment. The apparatus comprises at least one section for shielding outer surface of the movable segment and the articulation as part of the structure portion, the shielding section and segment outer surface defining a cavity therebetween. The shielding section includes at least first and second portions mating at respective ends thereof to form a joint permitting relative rotational movement of said portions. The apparatus further comprises gas input means adapted to be connected to a supply of inactive gas for filling the cavity and gas output means providing escape of the inactive gas out of the cavity while maintaining within the cavity a positive gas pressure relative to environment ambient pressure sufficient to substantially prevent contamination of the structure portion from the working environment. The gas output means comprise a contactless portion of the joint formed by the respective ends of the first and second portions.

According to a further broad aspect of the present invention, there is provided an apparatus for shielding at least a portion of a movable articulated structure including at least two segments connected through an articulation to allow movement of at least one of the segments, the structure portion having to be protected against contamination from a hard working environment, the apparatus comprising a shielding cover having at least one section for covering outer surface of the movable segment and the articulation as part of the structure portion, the shielding section and segment outer surface defining a cavity therebetween. The apparatus further comprises gas input means adapted to be connected to a supply of inactive gas for filling the cavity and gas pressure regulating means for maintaining within the cavity a gas pressure relative to the environment ambient pressure sufficient to substantially prevent contamination of the structure portion from the working environment. The cover section is essentially made of a substantially gas-tight and impermeable flexible material which is sufficiently stiff to provide the cover section with sufficiently smooth and stiff outer surface under the positive pressure, to substantially prevent physical contact between the segment outer surface and the cover section which could result in cover damage.

According to a still further broad aspect of the present invention, there is provided a shielded apparatus for working in hard environment. The apparatus comprises a movable articulated structure including at least two segments connected through an articulation to allow movement to at least one of the segments through drive means and control means, at least a portion of the articulated structure having to be protected against contamination from the hard working environment. The apparatus further comprises at least one section for shielding outer surface of the movable segment and the articulation as part of the structure portion, the shielding section and segment outer surface section including at least first and second portions mating at respective ends thereof to form a joint permitting relative rotational movement between said portions. The apparatus further comprises means to supply an inactive gas to fill the cavity and gas output means providing escape of the inactive gas out of the cavity while maintaining within the cavity a positive gas pressure relative to environment ambient pressure which is sufficient to substantially prevent contamination of the structure portion from the working environment, the gas output means comprising a contactless portion of the joint formed by the respective ends of said first and second portions.

According to a still further broad aspect of the present invention, there is provided a shielded apparatus for working in hard environment comprising a movable articulated structure including at least two segments connected through an articulation to allow movement of at least one of the segments through drive means connected to control means, at least a portion of the articulated structure having to be protected against contamination from the hard working environment, the apparatus further comprising a shielding cover having at least one section for covering outer surface of the movable segment and the articulation as part of the structure portion, the cover section and segment outer surface defining a cavity therebetween. The apparatus further comprises gas input means adapted to be connected to a supply of inactive gas for filling the cavity and gas pressure regulating means for maintaining within the cavity a positive gas pressure sufficient to substantially prevent contamination of the structure portion from the working environment. The cover section is essentially made of a substantially gas-tight and impermeable flexible material which is sufficiently stiff to provide the cover section with sufficiently smooth and stiff outer surface under said positive pressure, to substantially prevent physical contact between the segment outer surface and the cover section which could result in cover damage.

BRIEF DESCRIPTION OF THE DRAWINGS

Preferred embodiments of the apparatus according to the present invention will be now described with reference to the accompanying drawings in which:

FIGS. 7, 8 and 9 are enlarged partially cutaway side views of the further rotary joints shown encircled in FIG. 2;

DETAILED DESCRIPTION OF THE PREFERRED EMBODIMENTS

Figure 1:
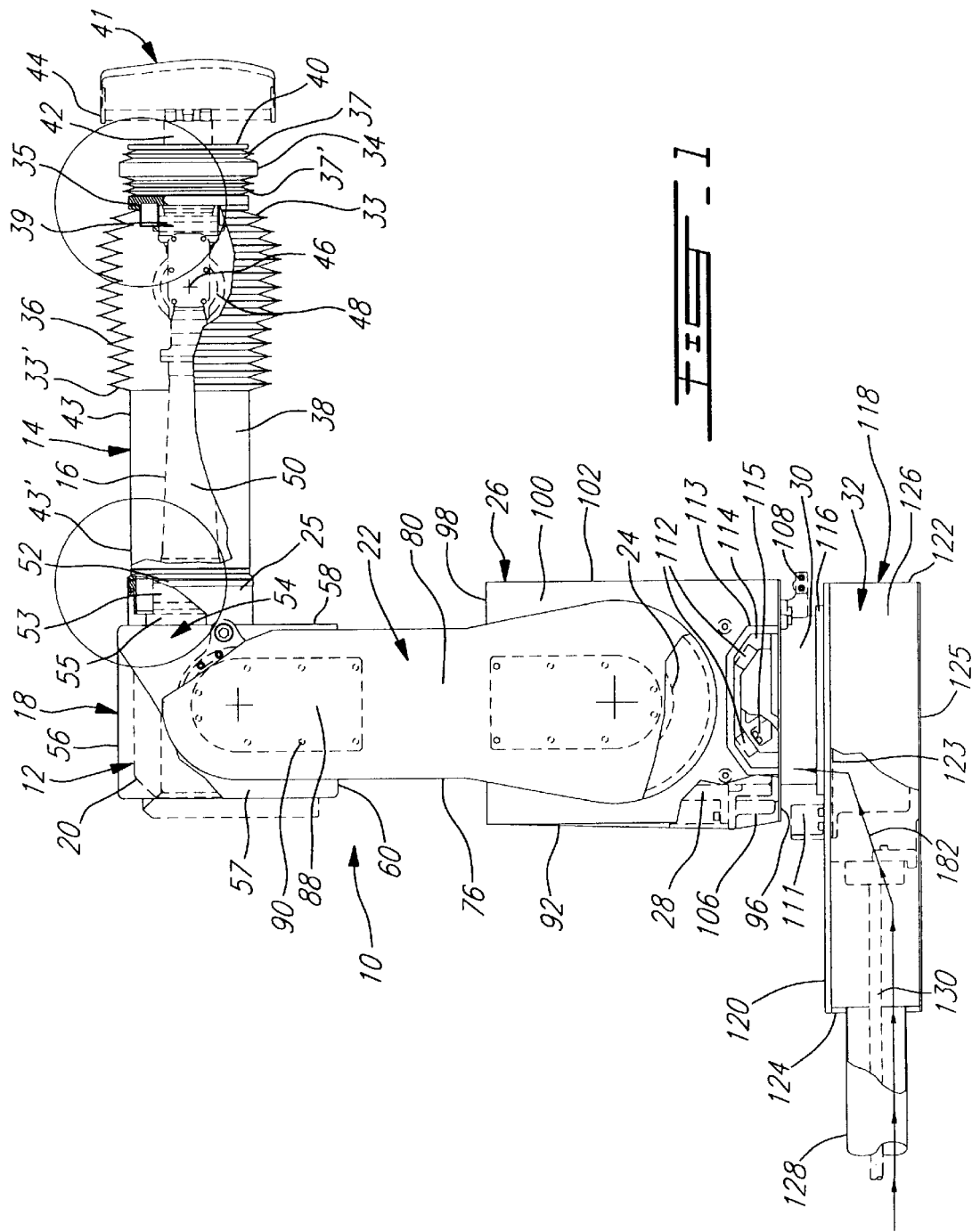
FIG. 1 is a partially cut-away side view of a first embodiment of an apparatus according to the present invention, illustrating a robot arm provided with a shielding cover and showing two encircled rotary joints.
Figure 2:
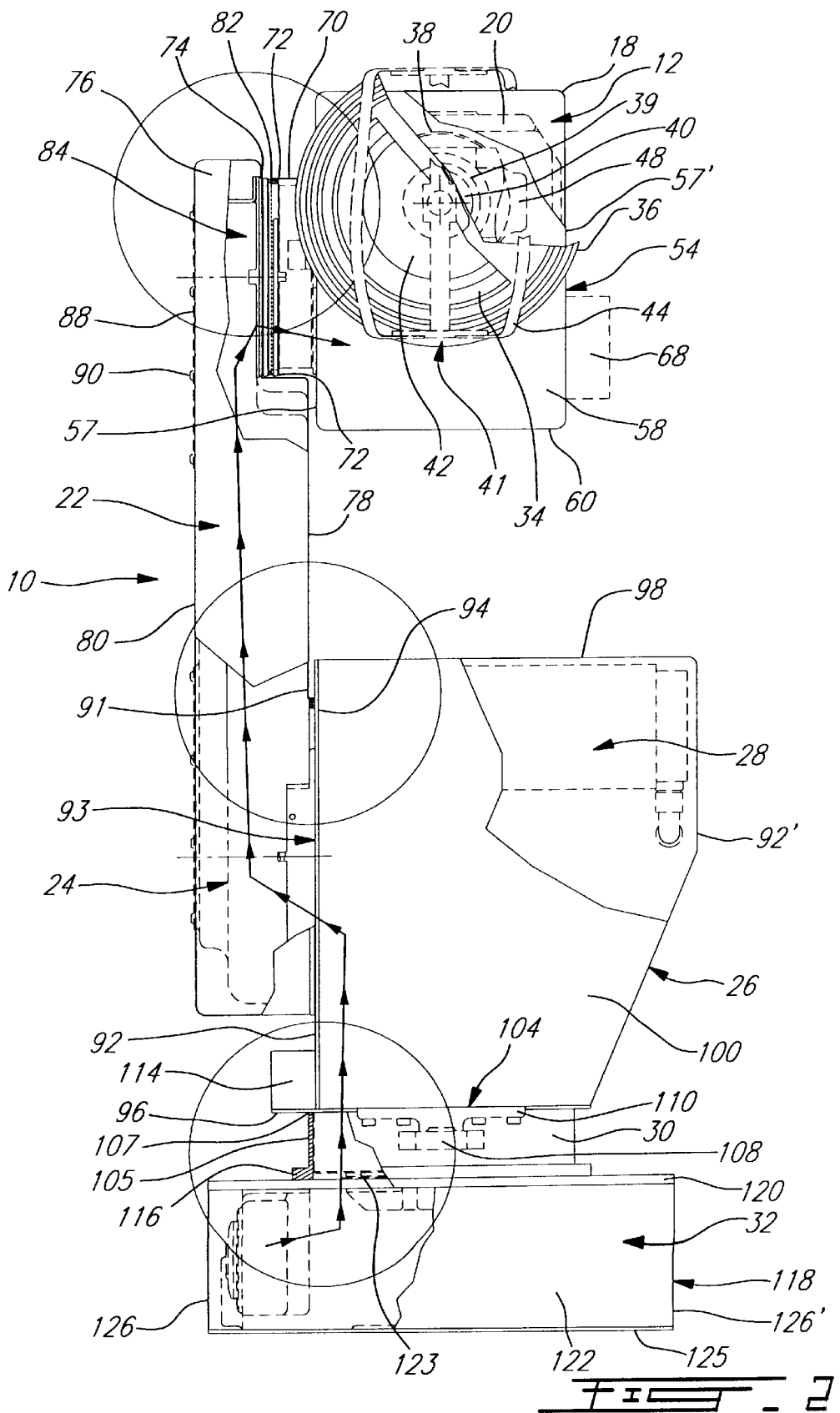
FIG. 2 is a partially cut-away front view of the apparatus of FIG. 1, showing three further encircled rotary joints.
Figure 3:
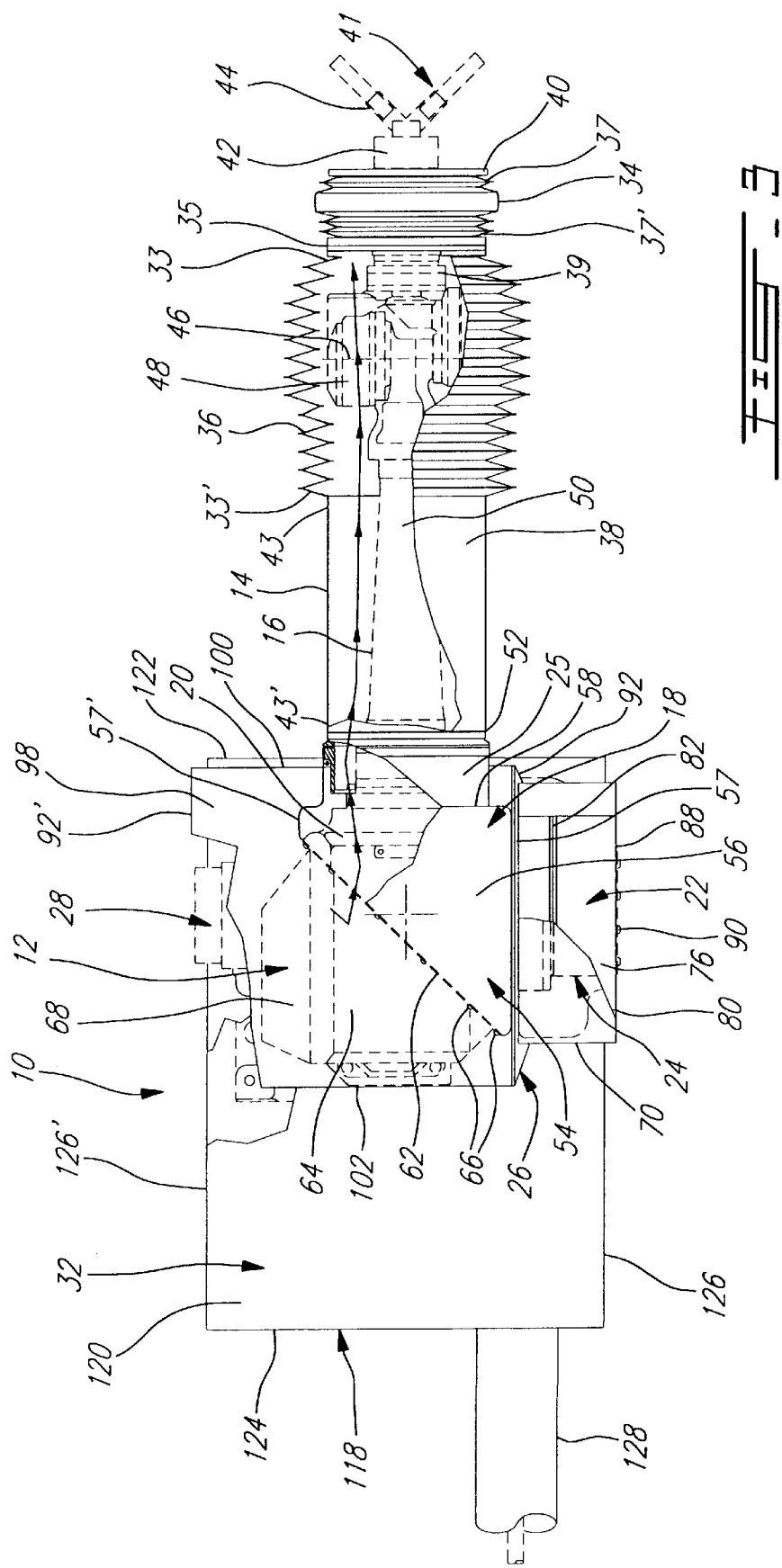
FIG. 3 is a partially cut-away top view of the apparatus of FIG. 1.

Referring now to the drawings, and particularly to FIGS. 1–3, a first preferred embodiment of a shielding apparatus according to the present invention is generally designated at numeral 10. The shielding apparatus 10 shown in FIGS. 1–3 is used to cover a robot arm illustrated in dashed lines and generally designated at 12 as part of a multi-axis industrial robot system such as the FANUC M-710. It is to be understood that other movable articulated structures including at least two segments connected through an articulation, such as mechanical linkages, can be shielded or be part of an apparatus of the present invention, whenever at least a portion of such articulated structures have to be protected against outside contamination from the working environment. The apparatus 10 comprises a first shielding or cover section 14 for covering the front arm segment 16 of the robot arm 12, a second shielding or cover section 18 for partially covering an upper pivoting articulation 20, a third shielding or cover section 22 for covering a middle arm segment 24 of the robot arm 12 and a fourth shielding or cover section 26 for covering a lower pivoting articulation 28 of the robot arm 12. The robot arm 12 stands on a mounting ring 30 secured to a fixed base 32. The first shielding section 14 comprises an end rotating portion 34, a pivoting portion 36 and a rear rotating portion 38. The end portion 34, in the form of bellows, is provided for covering a safety clutch (not shown) of a conventional construction being coupled to a mounting disk 40 to which is secured a head 41 holding a working element or tool 44, which is a dual-blade meat cutting tool in the example shown in FIGS. 1–3. The front end edge 37 of the end portion bellows 34 is tightly attached to the mounting disk 40 through a proper gastight and impermeable adhesive. The safety clutch is caused to be released whenever the tool 44 runs against an obstacle, thereby preventing or limiting damage either to the robot or obstacle. The rear end edge 37' of the end rotating portion 34 is coupled in a close mating relationship to a front end edge 33 of the pivoting portion 36 through a first rotary joint 35, which will be later described in more detail with reference to FIG. 5. The pivoting portion 36 is provided for covering an end rotary actuator 39 followed by a pivoting actuator 48 provided on the front arm segment 16. The rotary actuator 39 controls rotation about an axis 40 of the tool 44. The pivoting portion 36 is in the form of bellows to allow pivoting movement of the tool 44 about an axis 46 through the control of the actuator 48 having cooperating elements respectively secured to an elongated arm member 50 as part of the front arm segment 16 and the end rotary actuator 39. The rear rotating portion 38 is formed with a generally cylindrical shape and has a front end edge 43 adapted to be tightly connected to a rear end edge 33' of the pivoting portion bellows 36, through use of a proper gastight and impermeable adhesive. The rear end 43' of the rear rotating portion 38 is in turn coupled in a close mating relationship to a front cylindrical end portion 25 of the second shielding section 18 through a second rotary joint 52, which will be later described in more detail with reference to FIG. 6. The front arm section 16 of the robot arm 12 comprises a rear rotating articulation formed by a rotating portion 53 and a fixed portion 55 secured to the upper pivoting articulation 20. The cylindrical end portion 25 of the second shielding section 18 is tightly attached to a main portion 54 thereof formed by a tight assembly of top wall 56, side walls 57, 57', front wall 58 and bottom wall 60. A diagonally extending rear wall 62 is tightly attached to outer edges of walls 57, 57' 56 and 60 through proper fasteners 66 to form a closed cavity containing a protected portion of the upper pivoting articulation 20, which also comprises an articulation portion 64 which is was already sealed at the robot arm manufacturing stage, as better shown in FIG. 3. Although the sealed articulation portion 64, which includes the pivoting actuator casing 68, does not require to be further shielded, thereby providing direct access thereto for maintenance, the shielding section 18 may be designed to entirely cover the upper pivoting articulation 20.

The shielding section 18 is further provided with a side cylindrical portion 70 having an inner side edge 72 tightly attached to the side wall 57, and having an outer side edge 72' being coupled in a close mating relationship to an upper inner side edge 74 of the third shielding section 22 covering the middle arm segment 24 through a third rotary joint 82, which will be later described in more detail with reference to FIG. 7. The third shielding section 22 is formed by a tight assembly of peripheral wall 76, inner side wall 78 and outer side wall 80. A generally circular upper opening 84 is provided in the outer side wall 80, the edge of which opening 84 being tightly attached to another side edge of the rotary joint 82, as will be explained with reference to FIG. 7. A second opposed opening 84 is provided in the outer side wall 78 to give access to the upper pivoting articulation 20 by withdrawing a cover plate tightly affixed to the outer side wall 78 through fasteners 90. A lower inner side edge 91 of the third shielding section 22 defines an opening 93 being coupled in a close mating relationship through a fourth rotary joint 94, which will be later described in more with reference to FIG. 8, to an inner side wall 92 as part of the fourth shielding section 26 covering the lower pivoting articulation 28 of the robot arm 12, as better shown in FIG. 2. The fourth shielding section 26 further comprises a bottom wall 96 to which are tightly attached top wall 98, outer side wall 92', front wall 100 and rear wall 102. As shown in FIG. 2, the bottom wall 96 is provided with a main opening 104 though which a rotating frame 106 as part of the robot arm 12 extends upwardly, as shown in FIG. 1. Upper edge 105 of the mounting ring 30 forms with the underneath surface of the bottom wall 96 a fifth rotary joint 107, as will be later explained in more detail with reference to FIG. 9. The bottom wall 96 is further provided with small openings to provide sealed installation of a rotation stopper 108 secured to the rotating frame 106 with mounting member 110 as part of the robot arm 12, for firmly securing thereof to the rotating frame 106, which stopper 108 is provided to cooperate with at least one fixed stopper 111 firmly secured to the fixed robot base 32, to limit rotation range of the rotating frame 106 of the robot arm 12 to a predetermined extent. Further small opening are provided on the front wall 100 to allow sealed installation trough sealing strip 113 and extension sealing portion 114 of further stoppers 112 secured to the rotating frame 106 through mounting block 115 to limit pivoting range of the middle arm segment 24 in vertical plane.

The mounting ring 30 is provided with a flanged portion 116 being firmly secured to the fixed robot base 32, provided with shielding casing or cover 118 having a top wall 120 provided with a main opening 123 though which upwardly extends the rotating frame 106, as better seen in FIG. 2. The shielding casing 118 further has a front wall 122, rear wall 124, bottom wall 125 and side walls 126, 126'. The shielding casing 118 communicates with a duct 128 containing line 30 through which electric power, pneumatic and/or hydraulic power are supplied to the robot arm 12. The duct 128 is also used to supply the casing 118 and the shielding sections 14, 18, 22 with pressurized gas, which is air as produced by a conventional blower unit 132 in an example shown in FIG. 4, which draws air from a controlled atmosphere location. The pressurized inactive gas provides positive gas pressure, relative to ambient environment pressure, within communicating cavities formed between inner surface of shielding sections 14, 18, 22, 26 and outer surface of the corresponding robot arm segments 16, 20, 24, 28. As will be later explained with reference to FIG. 5–9, the joints 35, 52, 82 and 94 are designed to allow escape the pressurized gas out of the communicating cavities, while maintaining within the cavities a gas pressure sufficient to prevent contamination of the covered arm portion from the working environment, either in operation or during washing.

The first and second cover sections 14 and 18 are essentially made of a substantially gastight and impermeable flexible material which is sufficiently stiff to provide the cover section with sufficiently smooth and stiff outer surface under sufficient positive pressure, to substantially prevent physical contact between the robot arm segment outer surface and the cover section which could result in cover damage. It is to be understood that any of the cavities associated with shielding sections 14, 18, 22 and 26 can be independently supplied with a separate gas feeding line, and that only one of the joints 35, 52, 82 and 94 can be designed to allow gas escape, provided the positive pressure is maintained under the maximum pressure rating the shielding material can take without being damaged.

Figure 4:
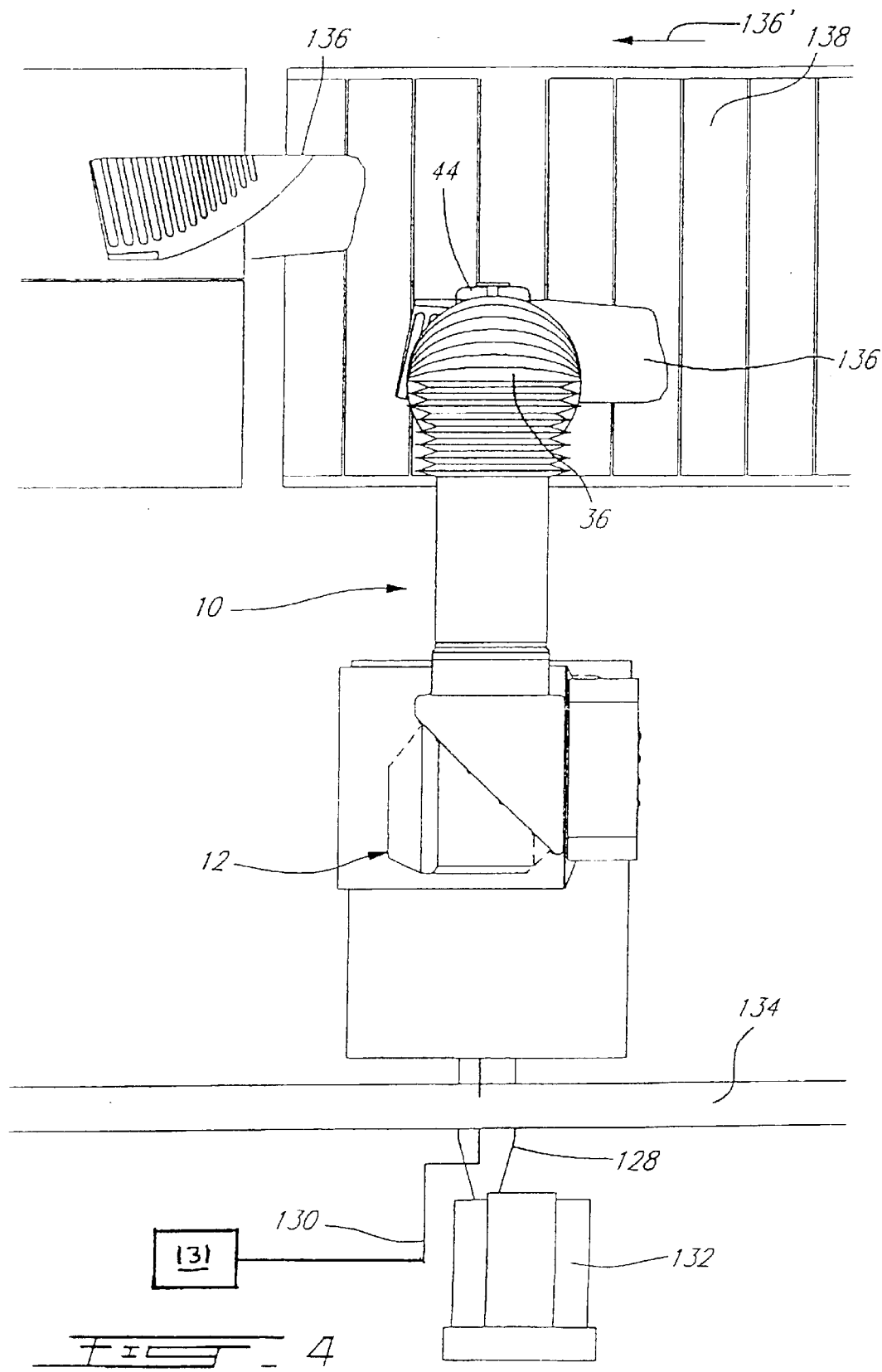
FIG. 4 is schematic top view of the apparatus of FIG. 1 used in a robot system as part of a meat cutting automated line.

Referring now to FIG. 4, it is illustrated a robot system using the apparatus 10 according to the embodiment shown in FIGS. 1–3, as part of a meat cutting automated line. Movement of the robot arm 12 provided with cutting tool 44 is controlled through line 130 by a conventional robot controller (not shown) located within a control room 134, according to a predetermined program and/or sensed signals, to cut the meat pieces 136 transported by the conveyer 138 as they pass within the working range of the robot arm 12 in the direction of arrow 136. In FIG. 4, the pivoting portion 36 is shown downwardly deformed following a downwardly pivoting movement of the actuator 48 shown in FIGS. 1–3, to bring the tool 44 in desired a cutting position above the conveyer 138. It is to be understood that any type of shielding portion construction equivalent to bellows can be used for portions 34 and 36 adapted to the robot arm 12 shown in FIG. 1–4, provided it shows sufficient flexibility to allow pivoting movement of the actuator 48, while showing required gastightness and impermeability properties.

Besides gastightness and impermeable characteristics, materials of which the shielding sections are made are preferably chosen to resist to corrosive substances as found in cleaning products, and its external surface must be free of cavities where bacteria could grow. Moreover, apart from plane walls such as rear wall 62, inner side wall 92, bottom wall 96, and casing 118 which can be made of rigid material, the material used to manufacture the shielding sections is preferably sufficiently flexible to provide the shielded section with sufficiently smooth and stiff outer surface under positive gas pressure, to render the outer surface washable. Examples of materials suitable for meat processing environment are FDA 8128, 28 oz., food grade vinyl coated polyester as distributed by Soper, Engineered Fabric Products; LFP 2100, 100% teflon resin as distributed by Intertex Textiles Inc., Textiles Coated International, or 2100-96/440 G/M2 polyurethane coated nylon fabric as distributed by Barrday Inc. Rear wall 62, inner side wall 92, bottom wall 96, and casing 118 can be made of a board type material comprising a core of any suitable rigid material onto which a layer of any of the above flexible materials has been incorporated through a proper adhesive.

Figure 5:
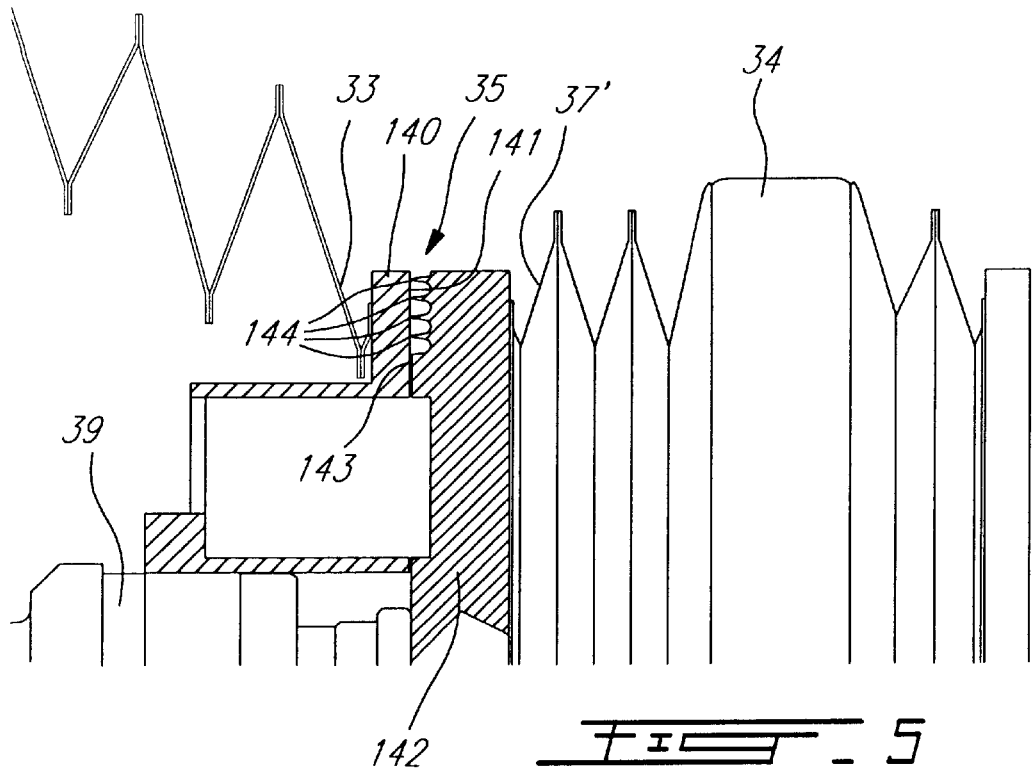
FIGS. 5 and 6 are enlarged partially cut-away side views of the rotary joints shown encircled in FIG. 1.

Turning now to FIG. 5–9, rotary joints construction will be described, beginning with rotary joint 35 as shown in FIG. 5. The rotary joint 35 comprises a first flanged ring 140 to which the front end edge 33 of the pivoting portion 36 is tightly attached, the ring 140 having an outer race plane surface 141 and being secured to the body of the rotary actuator 39. The joint 35 further comprises a second ring 142 having an inner race surface 143 and being tightly affixed to the rear edge 37' of the shielding portion 34 and secured to the safety clutch body (not shown). The inner race surface 143 is provided with a plurality of concentric circular ribs 144 defining a plurality of grooves forming a labyrinth. Relative position of first and second rings 140 and 142 are adjusted to provide minimal spacing between the inner race ribs and the outer race surface, to avoid physical contact therebetween. The minimum spacing that can be achieved mostly relies on manufacturing tolerances of the joint components, which can be typically within about 0.002–0.003 inch range. Inactive gas turbulence occurring through the successive ribs and grooves yields to maintain a pressure gradient between the shielding cavity and the outside environment, without the need of physical sealing contact. Optimum minimal spacing is achieved when desired positive pressure regulation is obtained. Use of such labyrinth seal has an advantage of minimizing torque required to rotate mating portions of the shielding section, reducing maintenance due to parts wearing. It is to be understood that only a portion of the circular inner race surface 143 of the second ring 142 can be provided with contactless ribs 144, provided desired positive pressure regulation is obtained.

Figure 6:
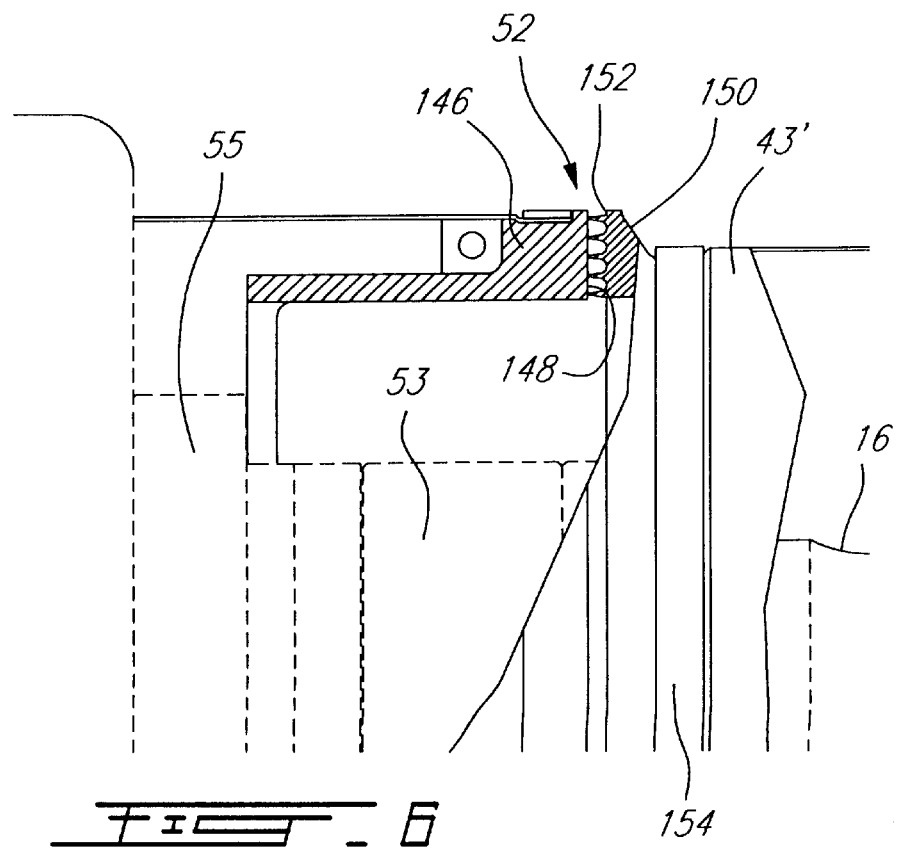

Turning now to FIG. 6, the rotary joint 52 comprises a first ring 146 having an outer race plane surface 148 an to which a front cylindrical end portion 25 of the second shielding section 18 is tightly attached, the ring 146 being secured to the fixed portion 55 of the rear rotating articulation of the front arm section 16. The joint 52 further comprises a second ring 150 having an inner race surface 152 and being tightly affixed to the rear edge 43' of the shielding portion 14 with a collar 154, the ring 150 being rigidly secured to the rotating portion 53. The inner race surface 152 is provided with a plurality of concentric circular ribs 156 defining a plurality of grooves forming a labyrinth, as described before.

Referring now to FIG. 7, the rotary joint 82 comprises a first ring 158 having an outer race plane surface 160 and being secured to an upper portion of the middle arm segment 24. The upper inner side edge 74 of the third shielding section 22 is tightly attached to the ring 158, which is rigidly secured to the upper portion of the middle arm segment 24 through a collar 162. The joint 82 further comprises a second ring 164 having an inner race surface 166 and being tightly affixed to the rear edge 43' of the shielding portion 14 with a collar 154, and being rigidly secured to the fixed portion 55 of the rear rotating articulation of the front arm section 16. The inner race surface 152 is provided with a pair of concentric circular ribs 156 defining a groove forming a labyrinth, as described before.

Turning now to FIG. 8, the rotary joint 94 uses the inner side wall 92 which is part of the fourth shielding section 26 to provide an outer race plane surface 168. The joint 94 comprises a ring 170 having an inner race surface 172 and being tightly affixed to the lower inner side edge 91 of the third shielding section 22, and being rigidly secured to the middle arm segment 24. The inner race surface 172 is provided with a plurality of concentric circular ribs 174 defining a plurality of grooves forming a labyrinth, as described before.

Turning now to FIG. 9, it can be seen that upper edge 105 of the mounting ring 30 forms with the underneath surface 176 of the bottom wall 96 the fifth rotary joint 107, using the underneath surface 176 as an outer race surface and the ring upper edge 105 as an inner race surface through a pair of concentric circular ribs 180 defining a groove forming a labyrinth, as described before.

Operation of an apparatus according to the first embodiment of the invention will be now explained with reference to FIGS. 1–4. The blower unit shown in FIG. 4 draws air from the controlled atmosphere of the room 134 to produce a flow of pressurized air through the line 128 for air feeding the shielding casing 118. Input flow of air designated by arrow 182 fills the inner cavity of the casing 118 to pass through the mounting ring, with a small portion of air flow escaping through the joint 107 as better shown in FIG. 2 and as explained before. Passing through an aperture in bottom wall, t1he flow of air fills the fourth shielding section 26 to reach the third shielding section 22 for filling thereof, with a small portion of air flow escaping through the joint 94 as explained before. The flow of air then passes through the side cylindrical portion 70 of the second shielding section 18 for filling thereof, with a small portion of air flow escaping through the joint 82 as explained before. Finally, the flow of air fills the first shielding section 14, with a small portion of air flow escaping through the joints 52 and 35. It is to be understood that an equilibrium state is rapidly reached when mean pressure equal to the desired positive pressure is attained at the optimal extension of the shielding portion made of flexible material, where the air input flow rate is equal to the sum of the air output flows escaping the joints 107, 94, 82, 52 and 35. The robot system provided with the shielding apparatus 10 is then ready to operate in a hard working environment, being substantially protected against contamination from substances such as dust, explosive gas or vapor, corrosive cleaning fluid, etc.

Figure 10:
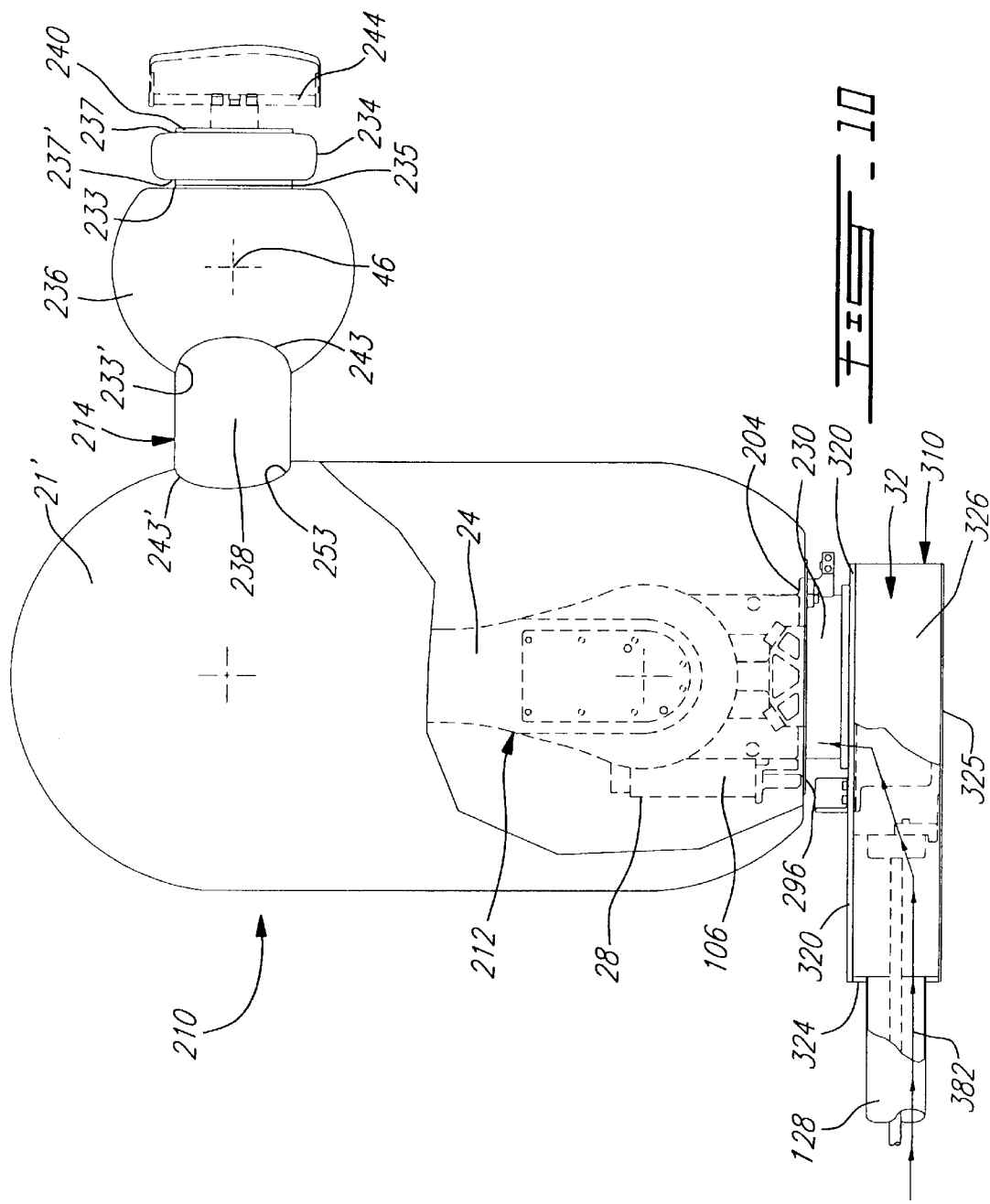
FIG. 10 is partially cut-away side view of a second embodiment of an apparatus according to the present invention, illustrating a robot arm provided with a shielding cover.
Figure 11:
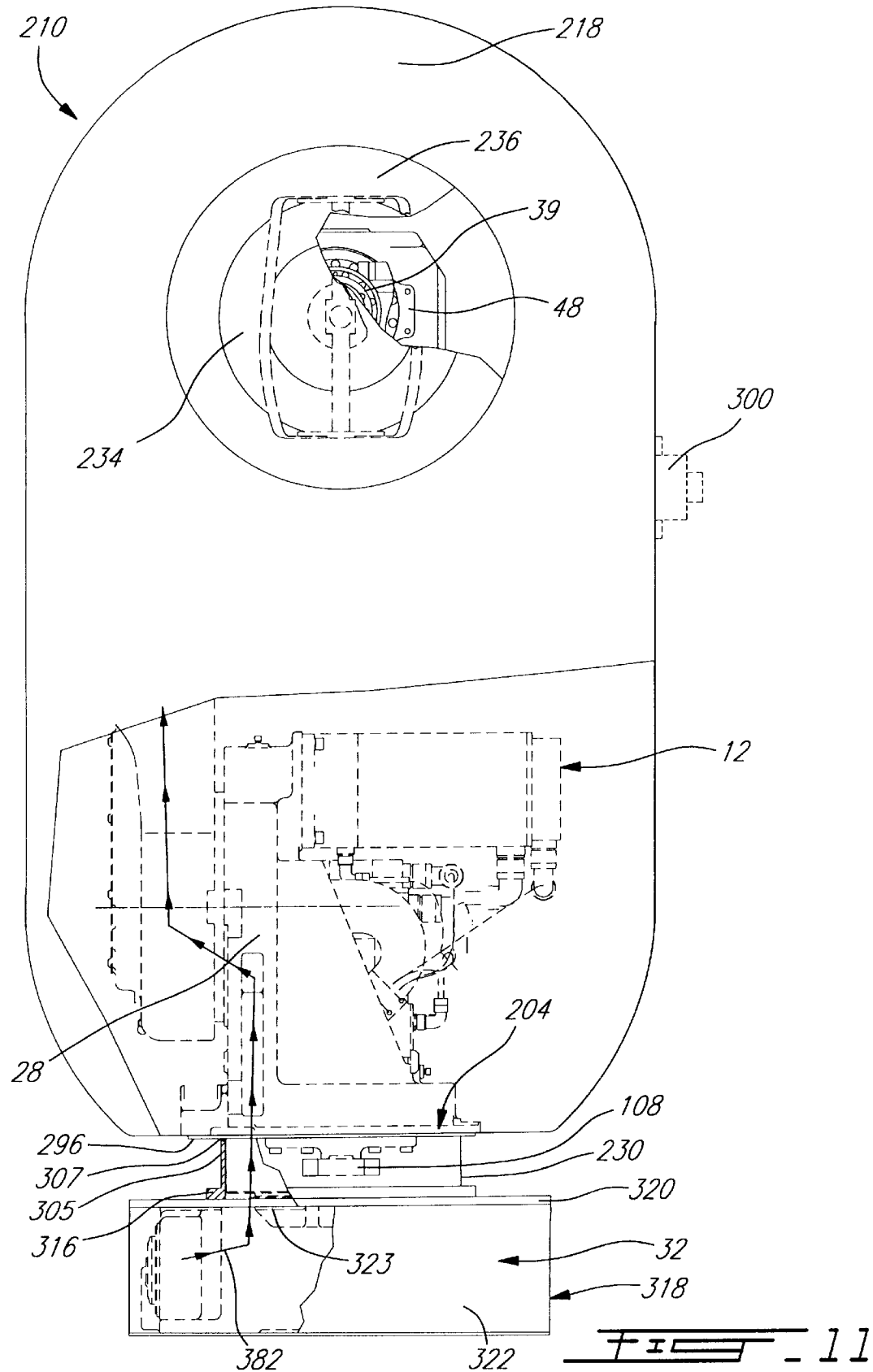
FIG. 11 is a partially cut-away front view of the apparatus of FIG. 10.
Figure 12:
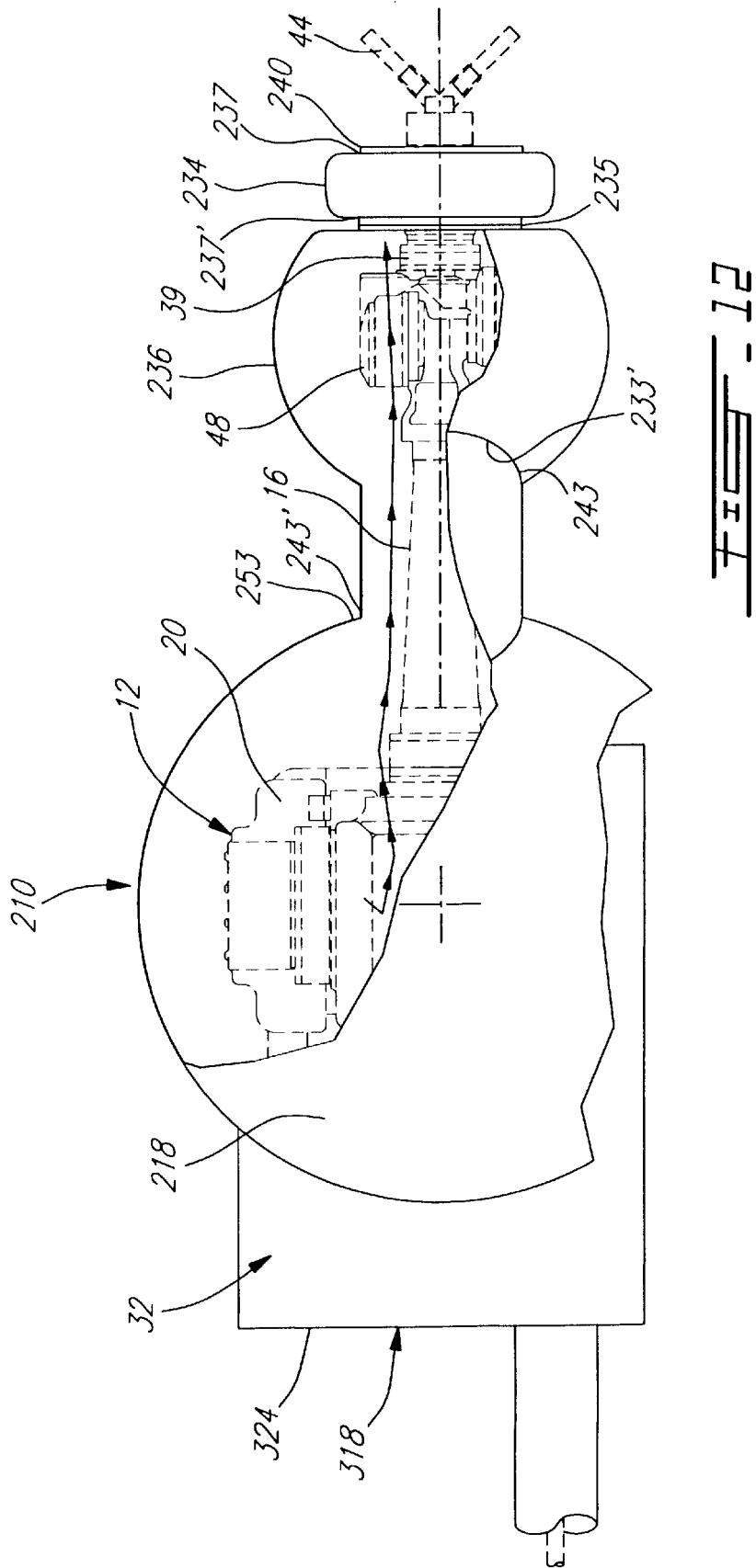
FIG. 12 is a partially cut-away top view of the apparatus of FIG. 10.

Referring now to FIGS. 10–12, a second preferred embodiment of an apparatus according to the present invention will be now described, being generally designated at numeral 210. The shielding apparatus 210 shown is used to cover a robot arm illustrated in dashed lines and generally designated at 212, which is of a same type than the robot arm described before with reference to the first preferred embodiment. The apparatus 210 comprises a first shielding or cover section 214 for covering the front arm segment 16 of the robot arm 12 as shown in FIG. 12. The apparatus 210 further comprises a second shielding or cover section 218 for completely covering the upper pivoting articulation 20, the middle arm segment 24 and the lower pivoting articulation 28 of the robot arm 12. The robot arm 12 stands on a mounting ring 230 secured to a fixed base 232. The first shielding section 214 comprises an end portion 234, a main portion 236 and a rear portion 238. The end portion 234, of a toroidal shape under sufficient positive pressure, is provided for covering a safety clutch (not shown), which is coupled to a mounting disk 240 to which is secured a head 241 holding the tool 44, as described before. The front end edge 237 of the end portion 234 is tightly attached to the mounting disk 240 through a proper gastight and impermeable adhesive. The rear end edge 237' of the end portion 234 is coupled in a close mating relationship to a front end edge 233 of the main portion 236 through a first rotary joint 235 of a same construction as described before with reference to FIG. 5. The main portion 236 is provided for covering the end rotary actuator 39 followed by the pivoting actuator 48 provided on the front arm segment 16, as shown in FIGS. 11 and 12. The main portion 36 of a generally spherical shape is made of a material showing sufficient flexibility to allow pivoting movement of the tool 44 about an axis 46 within a working pivoting angle range through the control of the actuator 48, as explained before. The rear portion 238 is formed with a generally cylindrical shape and has a front end edge 243 adapted to be tightly connected to a rear end edge 233' of the main portion 236, through use of a proper gastight and impermeable adhesive. The rear end 243' of the rear portion 238 is in turn tightly attached to edge 253 of an aperture defined in an upper portion of the second shielding section 218. The rear portion 238 and the second section 218 are also made of a material showing sufficient flexibility to allow rotation movement of the front arm segment 16 within a working rotation angle range. It is to be understood that the end portion 234 can be designed in a similar way without use of the rotary joint 235 for limited working rotating angle range of the tool 244, through direct tight attachment to the safety clutch body. The second shielding section 218 further comprises a bottom wall 296 provided with a main opening 204 though which the rotating frame 106 as part of the robot arm 12 extends upwardly, as shown in FIG. 10. Upper edge 305 of the mounting ring 30 forms with the underneath surface of the bottom wall 296 a second rotary joint 307, of a similar construction as the joint illustrated in FIG. 9 and as described before. It is to be understood that the second section 218 can be designed in a similar way than rear portion 238 without use of the rotary joint 307 for limited working rotating angle range of the rotating frame 106, through direct tight attachment to the mounting ring 30. The bottom wall 296 is further provided with small openings to provide sealed installation of a rotation stopper 108, and as explained before. As shown in FIG. 11, the mounting ring 230 is provided with a flanged portion 316 being firmly secured to the fixed robot base 32, provided with shielding casing or cover 318 having a top wall 320 provided with a main opening 323 though which upwardly extends the rotating frame 106, as better seen in FIG. 11. The shielding casing 318 further has a front wall 322, rear wall 324, bottom wall 325 and side walls 326, 326'. The shielding casing 318 communicates with the duct 128 containing line 30 through which electric power, pneumatic and/or hydraulic power are supplied to the robot arm 12. The duct 128 is also used to supply the casing 318 and the shielding sections 314 and 318 with pressurized inactive gas, which is air as produced by a conventional blower as the one shown in FIG. 4. The pressurized inactive gas fills the communicating cavities formed between inner surface of shielding sections 314 and 318 and outer surface of the corresponding robot arm segments 16, 20, 24, 28, providing positive gas pressure within relative to ambient environment pressure. The first and second cover sections 214 and 218 being essentially made of a substantially gastight and impermeable flexible material which is sufficiently stiff to provide the cover section with sufficiently smooth and stiff outer surface under sufficient positive pressure, to substantially prevent physical contact between the segment outer surface and the cover section which could result in cover damage. The cover sections have sufficient area to provide cavities with sufficient volume to allow robot arm movement within its working range without requiring adverse stretching of the material. As explained before, the joints 235 and 307 are designed to allow escape the pressurized gas out of the communicating cavities, while maintaining within the cavities a gas pressure sufficient to extend the sections 314 and 318 to their working shapes, while preventing contamination of the covered arm portion from the working environment, either in operation or during washing. It is to be understood that any of the cavities associated with any portions of shielding sections 214 and 218 can be independently supplied with a separate gas feeding line, and that only one of the joint 235 and 307 can be designed to allow gas escape, provided the positive pressure is maintained under the maximum pressure rating the shielding material can take without being damaged. Alternately, it is also understood that an optional gas regulating valve 300 of a conventional construction as illustrated in dotted line in FIG. 11 can be used to obtain the desired positive pressure. Extendible materials as listed before can be used to form the required shapes for the portions 234, 236, 238 of section 214 and for section 218. It is to be understood that any other suitable gastight and impermeable material showing sufficient flexibility can be used. Other sealing techniques not using adhesive can be also employed depending upon the material used, such as heat or high frequency sealing techniques.

Operation of an apparatus according to the second preferred embodiment of the invention will be now explained with reference to FIGS. 4, 10–12. The blower unit shown in FIG. 4 draws air from the controlled atmosphere of the room 134 to produce a flow of pressurized air through the line 128 for air feeding the shielding casing 318. Input flow of air designated by arrow 182 fills the inner cavity of the casing 318 to pass through the mounting ring, with a small portion of air flow escaping through the joint 307 as better shown in FIG. 2 and as explained before. Passing through an aperture in bottom wall, the flow of air fills the second shielding section 218 to reach the three portions 238, 236 and 234 of the first shielding section 214, with a small portion of air flow escaping through the joint 235, as explained before. The robot system provided with the shielding apparatus 20 is then ready to operate in a hard working environment, being substantially protected against contamination from substances such as dust, explosive gas or vapor, corrosive cleaning fluid, etc.

It is within the ambit of the present invention to cover any modification or application of embodiments of shielding apparatus described in the above specification, provided it falls within the scope of the appended claims.

We claim:

1. An apparatus for shielding at least a portion of a movable articulated structure including at least two segments connected through an articulation to allow movement of at least one of said segments, the structure portion having to be protected against contamination from a working environment, said apparatus comprising:

at least one section for shielding outer surface of said at least one movable segment and said articulation as part of said structure portion, the shielding section and segment outer surface defining a cavity therebetween, the shielding section including at least first and second portions mating at respective ends thereof to form a joint permitting relative rotational movement of said portions;

gas input means adapted to be connected to a supply of inactiive gas for filling the cavity; and gas output means providing escape of the inactive gas out of the cavity while maintaining within the cavity a positive gas pressure relative to environment ambient pressure sufficient to substantially prevent contamination of the structure portion from the working environment, the gas output means comprising a contactless portion of the joint formed by the respective ends of said first and second portions.

2. An apparatus as claimed in claim 1, wherein said joint is a labyrinth joint.

3. An apparatus for shielding at least a portion of a movable articulated structure including at least two segments connected through an articulation to allow movement of at least one of said segments, the structure portion having to be protected against contamination from a working environment, said apparatus comprising:

a shielding cover having at least one section for covering outer surface of said at least one movable segment and said articulation as part of the structure portion, the cover section and segment outer surface defining a cavity therebetween;

gas input means adapted to be connected to a supply of inactive gas for filling the cavity; and gas pressure regulating means for maintaining within the cavity a positive gas pressure relative to environment ambient pressure sufficient to substantially prevent contamination of the structure portion from the working environment;

wherein the cover section is essentially made of a substantially gas-tight and impermeable flexible material which is sufficiently stiff to provide the cover section with sufficiently smooth and stiff outer surface under said positive pressure, to substantially prevent physical contact between the segment outer surface and the cover section which could result in cover damage.

4. An apparatus as claimed in claim 3, wherein said gas pressure regulating means comprise a gas regulating output valve.

5. An apparatus as claimed in claim 3, wherein the cover section includes first and second portions mating at respective ends thereof, the gas pressure regulating means comprising a contactless portion of a joint formed by the respective ends of said first and second portions, said joint providing relative rotational movement of said portions.

6. An apparatus as claimed in claim 1, wherein said joint is a labyrinth joint.

7. A shielded apparatus for working in hard environment comprising:

a movable articulated structure including at least two segments connected through an articulation to permit movement of at least one of said segments through drive means connected to control means, at least a portion of said articulated structure having to be protected against contamination from the working environment;

at least one section for shielding outer surface of said at least one movable segment and said articulation as part of the structure portion, the shielding section and segment outer surface defining a cavity therebetween, the shielding section including at least first and second portions mating at respective ends thereof to form a joint permitting relative rotational movement between said portions;

gas input means adapted to be connected to a supply of inactive gas for filling the cavity; and gas output means providing escape of the inactive gas out of the cavity while maintaining within the cavity a positive gas pressure relative to environment ambient pressure which is sufficient to substantially prevent contamination of the structure portion from the working environment, the gas output means comprising a contactless portion of the joint formed by the respective ends of said first and second portions.

8. An apparatus as claimed in claim 7, wherein said joint is a labyrinth joint.

9. A shielded apparatus for working in hard environment comprising:

a movable articulated structure including at least two segments connected through an articulation to permit movement of at least one of said segments through drive means connected to control means, at least a portion of said articulated structure having to be protected against contamination from the working environment;

a shielding cover having at least one section for covering outer surface of said outer surface of said at least one movable segment and said articulation as part of the structure portion, the cover section and segment outer surface defining a cavity therebetween;

gas input means adapted to be connected to a supply of inactive gas for filling the cavity; and gas pressure regulating means for maintaining within the cavity a positive gas pressure relative to environment ambient pressure which is sufficient to substantially prevent contamination of the structure portion from the working environment;

wherein the cover section is essentially made of a substantially gas-tight and impermeable flexible material which is sufficiently stiff to provide the cover section with sufficiently smooth and stiff outer surface under said positive pressure, to substantially prevent physical contact between the segment outer surface and the cover section which could result in cover damage.

10. An apparatus as claimed in claim 9, wherein said gas pressure regulating means comprise a gas regulating output valve.

11. An apparatus as claimed in claim 10, wherein the cover section includes first and second portions mating at respective ends thereof, the gas pressure regulating means comprising a contactless portion of a joint formed by the respective ends of said first and second portions, said joint providing relative rotational movement of said portions.

12. An apparatus as claimed in claim 11, wherein said joint is a labyrinth joint.

* * * * *